US012421679B2

(12) United States Patent
Townsend et al.

(10) Patent No.: US 12,421,679 B2
(45) Date of Patent: Sep. 23, 2025

(54) LOW PROFILE MAGNET MOUNTED PERMANENT MAGNETIC SWEEPER APPARATUS WITH WRAP AROUND TECHNOLOGY

(71) Applicant: Bluestreak Equipment Inc., Delhi (CA)

(72) Inventors: Emmett Townsend, Paris (CA); Brian Weber, Delhi (CA)

(73) Assignee: BLUESTREAK EQUIPMENT INC.

( * ) Notice: Subject to any disclaimer, the term of this patent is extended or adjusted under 35 U.S.C. 154(b) by 95 days.

(21) Appl. No.: 18/533,669

(22) Filed: Dec. 8, 2023

(65) Prior Publication Data

US 2024/0191446 A1 Jun. 13, 2024

Related U.S. Application Data

(60) Provisional application No. 63/431,304, filed on Dec. 8, 2022.

(51) Int. Cl.
*E01H 1/14* (2006.01)
*B66F 9/075* (2006.01)

(52) U.S. Cl.
CPC ........... *E01H 1/14* (2013.01); *B66F 9/07504* (2013.01)

(58) Field of Classification Search
CPC ............................... E01H 1/14; B66F 9/07504
See application file for complete search history.

(56) References Cited

U.S. PATENT DOCUMENTS 5,219,819 A * 6/1993 Sharma .................... B01J 20/20 502/437
5,481,983 A * 1/1996 Guzman ................... B03C 1/30 104/279
5,731,705 A * 3/1998 Guinn ..................... E21B 31/06 335/289
11,105,057 B2 * 8/2021 Hopwood ............. E01H 1/0845
2009/0223683 A1 * 9/2009 Davidson .................. E02F 7/04 171/45
2024/0159004 A1 * 5/2024 Maguire ............... H01F 7/0257
2024/0191446 A1 * 6/2024 Townsend ........... B66F 9/07504

OTHER PUBLICATIONS

Machine Translation of CN101152069A (Year: 2008).*

* cited by examiner

*Primary Examiner* — Sharidan Carrillo

(57) ABSTRACT

A low-profile magnet mounted permanent magnetic sweeper apparatus with wrap around technology is disclosed. The magnetic sweeper is mounted on the underside of a forklift or prime mover vehicle. The magnetic sweeper apparatus comprises a plurality of magnet mount pods mounted on each corner of the magnet housing. A large bar magnet is placed within the magnet housing and is capped on either end. A sleeve having a pull handle is around the magnet housing. Magnetic debris accumulates on the sleeve which can be pulled off the magnet housing whereby the debris can be removed.

5 Claims, 19 Drawing Sheets

| Distance A | 1" | 2" | 3" |
|---|---|---|---|
| Peak Gauss (G) | 630 | 254 | 134 |

Note: Gauss (G) shown is the peak gauss, measured in the center of the magnet at each distance.

| Distance A | 1″ | 2″ | 3″ |
|---|---|---|---|
| Peak Gauss (G) | 358 | 185 | 106 |

Note: Gauss (G) shown is the peak gauss, measured in the center of the magnet at each distance.

LOW PROFILE MAGNET MOUNTED PERMANENT MAGNETIC SWEEPER APPARATUS WITH WRAP AROUND TECHNOLOGY

CROSS REFERENCE TO RELATED APPLICATIONS

This application claims priority to and the benefit of U.S. Provisional Application Ser. No. 63/431,304, entitled "LOW PROFILE MAGNET MOUNTED PERMANENT MAGNETIC SWEEPER APPARATUS WITH WRAP AROUND TECHNOLOGY", filed on Dec. 8, 2023, the disclosure of which is incorporated herein by reference in its entirety.

BACKGROUND

The field of the disclosure relates to sweeper apparatuses, in particular to a magnetic sweeper apparatus.

A magnetic sweeper apparatus is typically configured as attachments to industrial vehicles (e.g., a forklift or prime mover) to assist in using magnetism to pick up ferrous or metallic objects. There may be several problems impacting magnetic sweepers including mounting problems, space availability problems and debris retention problems.

Mounting Problem:

This disclosure addresses attaching a magnetic sweeper bar to a forklift, fork truck or similar vehicle (prime mover) where owners and operators do not want to, or cannot, permanently alter their vehicle. In many cases these vehicles may be rented, such that the rental agreement does not allow lessors to drill, weld, or permanently alter the prime mover in any way. Additionally, problems exist where magnets cannot be mounted on the front or rear of the prime mover as they would obstruct the primary functions. Damage problems also exist when magnets are mounted on the front or rear of forklifts. Operators can hit things and damage both the forklift and/or the magnetic sweeper. This leaves the primary option to mount a magnet between the wheelbase of the primary mover.

Space Availability Problem:

Room or height under a forklift is a problem that must be overcome in mounting a magnet between the wheelbase of the forklift. This disclosure does not hinder normal use of the prime mover when installed between the wheels at an appropriate height. It addresses the low ground clearance that exists underneath the main body of the forklift or primary mover where the magnet bar must be as low profile as possible to fit underneath, while not getting caught up when travelling. As the ground clearance is especially low on electric models of forklifts, the invention also provides a way to clean off the magnet bar without reaching under the vehicle to avoid potential injury.

Debris Retention Problem:

Once debris is collected, it must not be wiped off the surface of the magnet if the ground or other obstacle is struck. The possibility for frequent ground strikes increases with low ground clearance vehicles, so this invention provides wrap around technology to allow debris to be retained on the magnet regardless of ground strikes. The wrap around feature also increases the quantity of metallic debris that can be collected, compared to a design that does not address the debris retention problem.

There is a desire to provide an improved magnetic sweeper that addresses one or more of these problems.

SUMMARY

A low-profile magnet mounted permanent magnetic sweeper apparatus with wrap around technology is disclosed. The magnetic sweeper is mounted on the underside of a forklift or prime mover vehicle. The magnetic sweeper apparatus comprises a plurality of magnet mount pods mounted on each corner of the magnet housing. A large bar magnet is placed within the magnet housing and is capped on either end. A sleeve having a pull handle is beneath the magnet housing. Magnetic debris accumulates on the sleeve which can be pulled off the magnet housing whereby the debris can be removed.

DETAILED DESCRIPTION

This disclosure discloses a magnetic sweeper apparatus that addresses the aforementioned mounting, space availability and debris retention problems.

Figure 1:
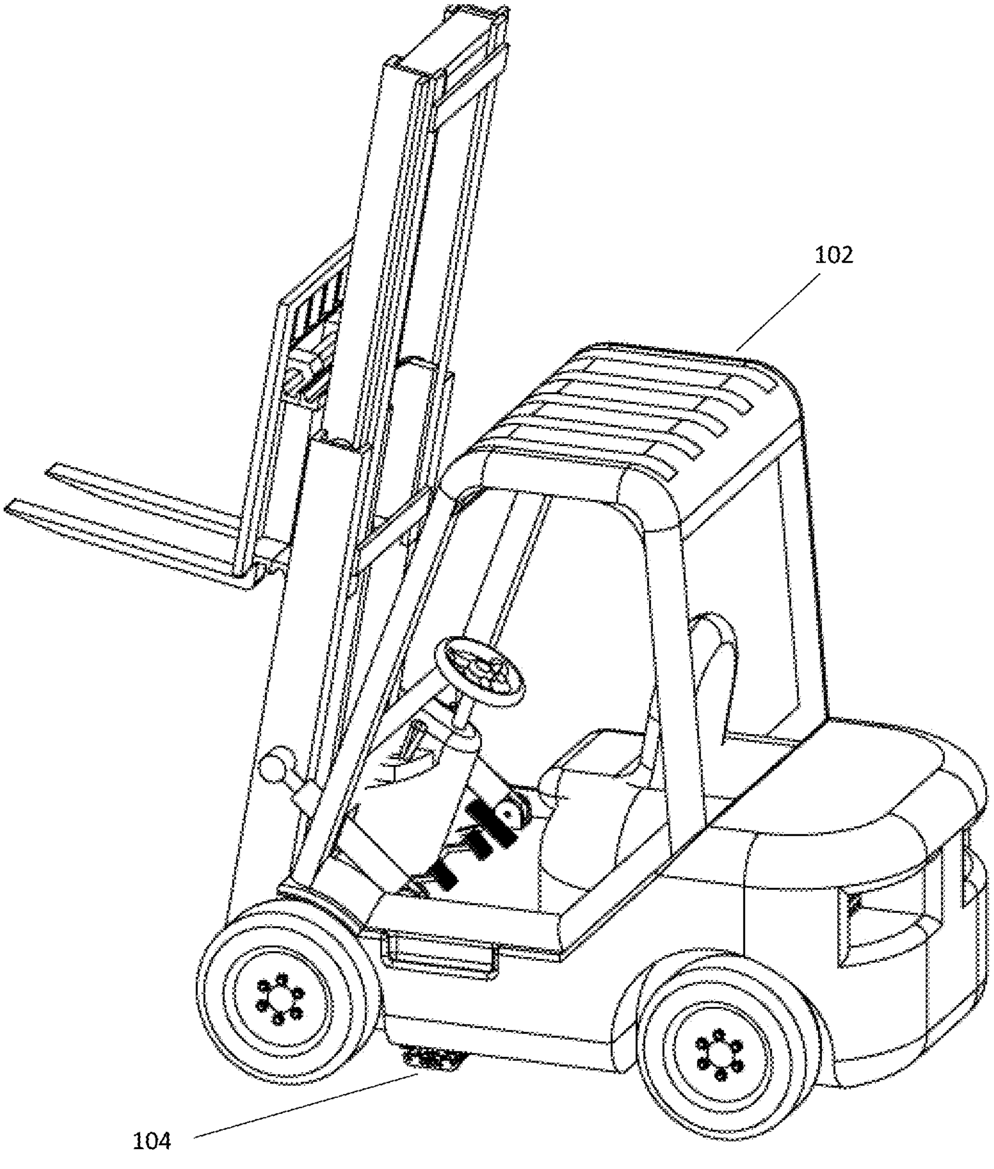
FIG. 1 is a line diagram of a perspective view of a forklift with a magnetic sweeper apparatus.
Figure 2:
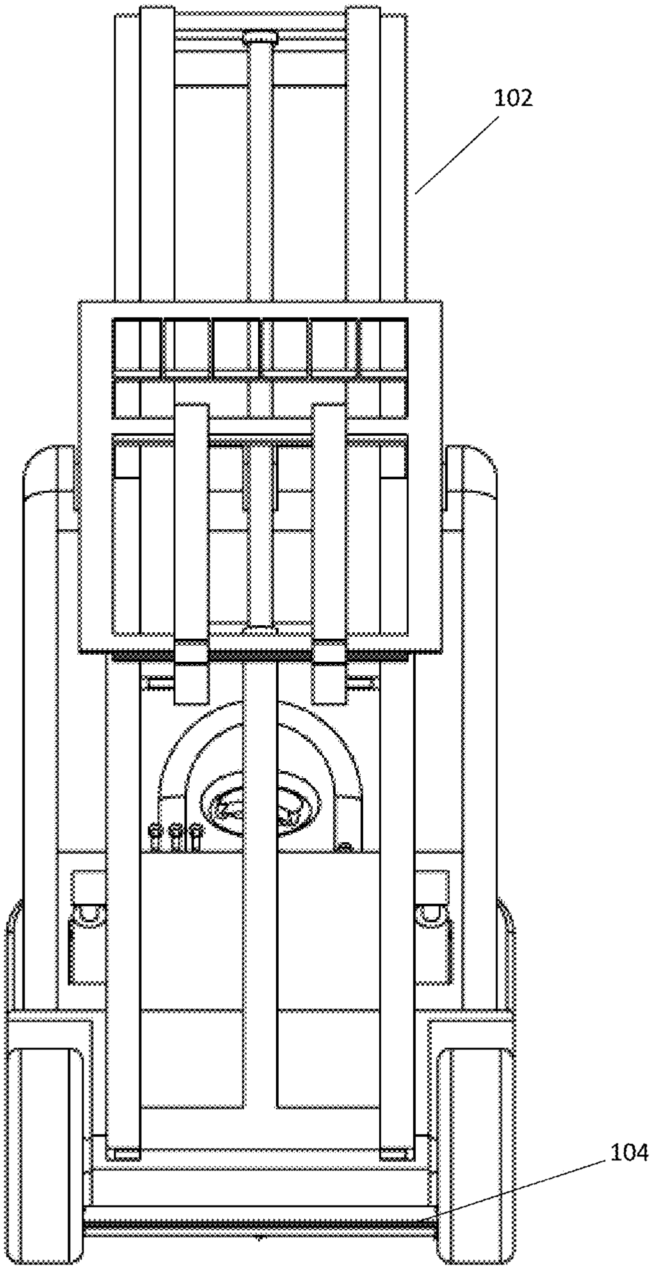
FIG. 2 is a line diagram of a front plan view of a forklift with a magnetic sweeper apparatus.
Figure 3:
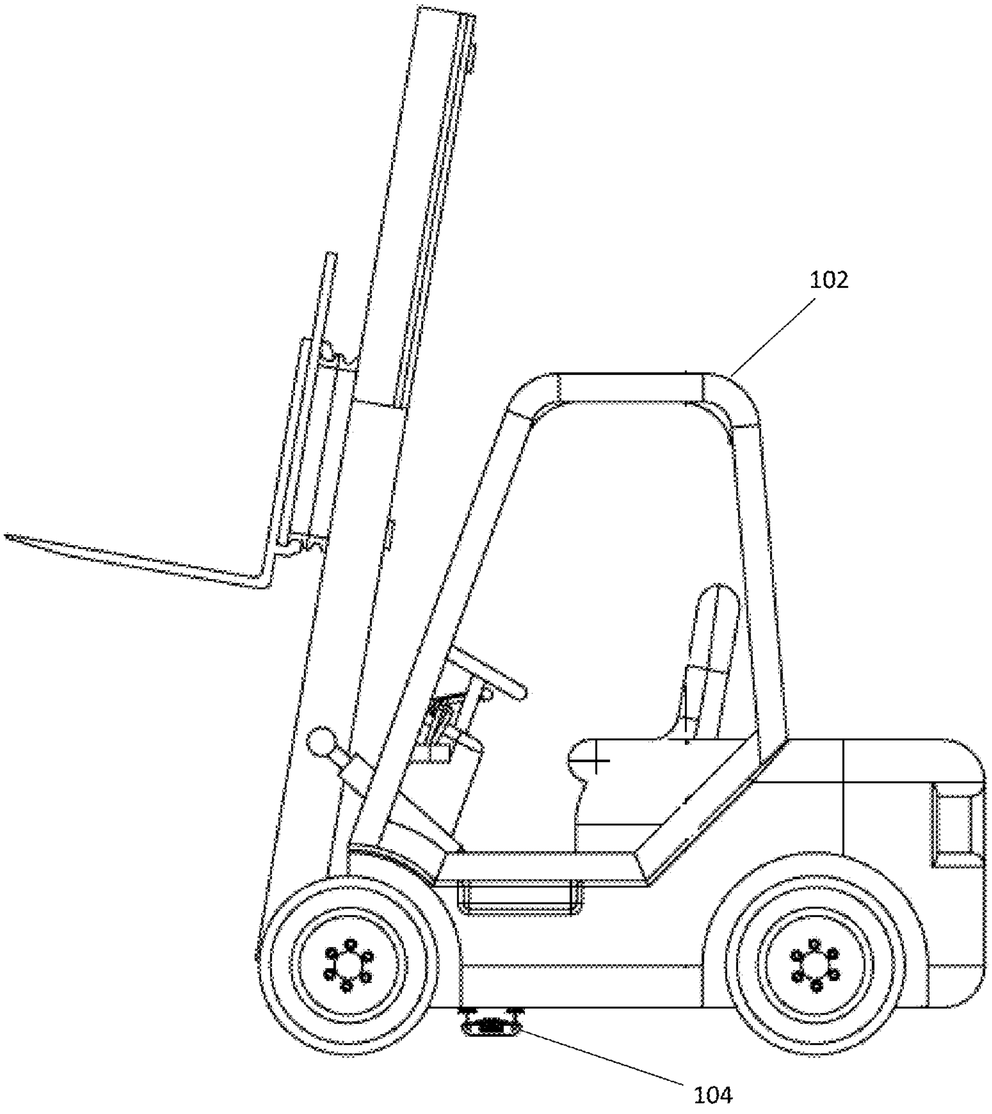
FIG. 3 is a line diagram of a right-side view of a forklift with a magnetic sweeper apparatus.
Figure 4:
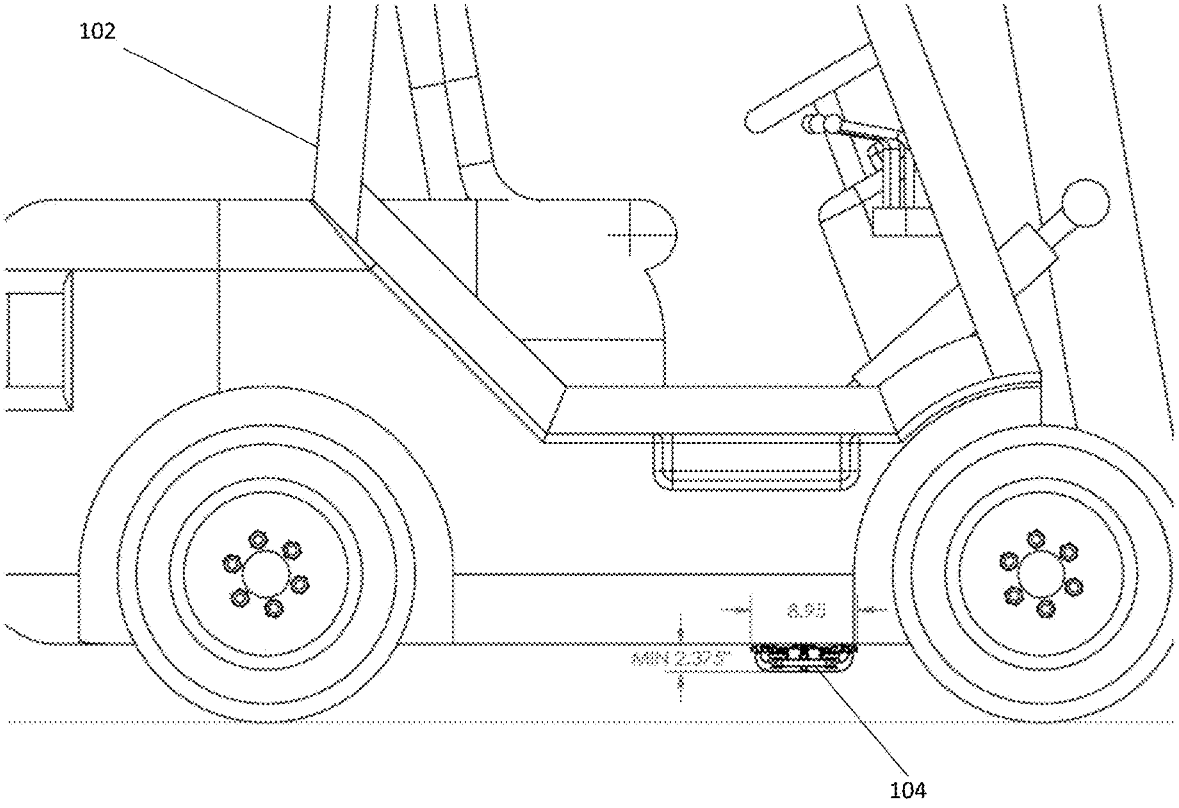
FIG. 4 is a line diagram of a left-side view of a forklift with a magnetic sweeper apparatus.

FIGS. 1-4 are line drawings of a forklift 102 with a magnetic sweeper apparatus 104 installed on the underside of the forklift 102. FIG. 1 is a line diagram of a perspective view of a forklift 102 with a magnetic sweeper apparatus 104. FIG. 2 is a line diagram of a front plan top view of a forklift 102 with a magnetic sweeper apparatus 104. FIG. 3 is a line diagram of a right-side view of a forklift 102 with a magnetic sweeper apparatus 104. FIG. 4 is a line diagram of a left-side view of a forklift 102 with a magnetic sweeper apparatus 104. According to FIG. 4, magnetic sweeper apparatus 104 has dimensions of 8.95" width×46.23" length×2.375" height, although other dimensions are also possible. For optimal performance, the magnetic sweeper apparatus operates within 1-3" of the ground.

Figure 5:
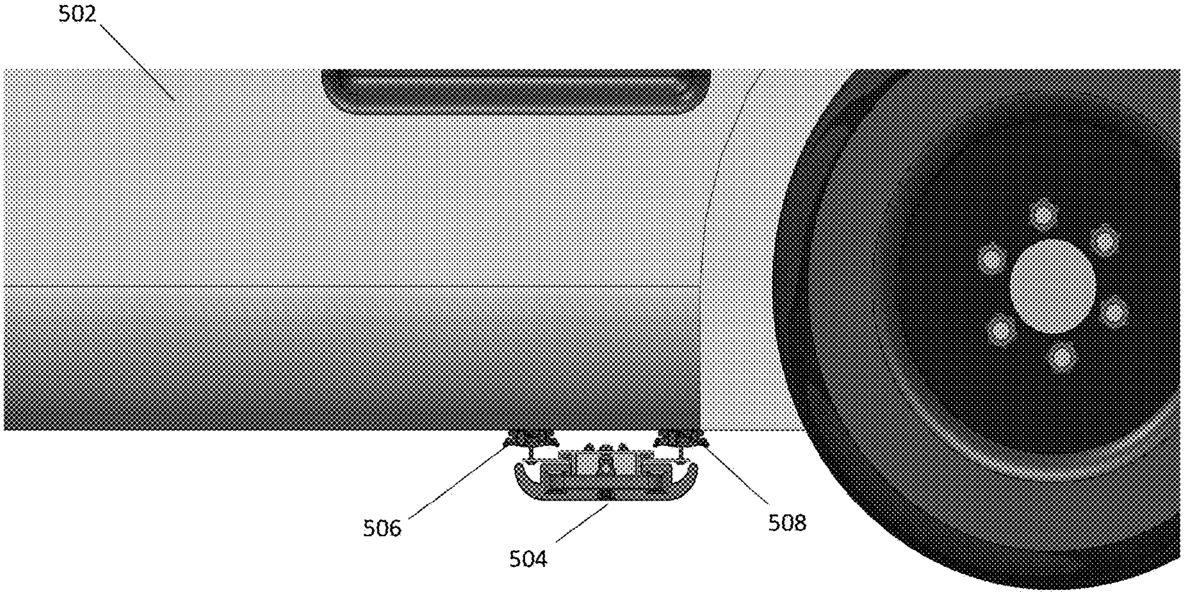
FIG. 5 is a diagram illustrating a left side view of a magnetic sweeper apparatus.

FIG. 5 is a diagram illustrating a left side view of a magnetic sweeper apparatus. According to FIG. 5, the magnetic sweeper apparatus 504 is shown attached to the underside of a forklift 502 or prime mover vehicle. The connection is a non-permanent attachment on the underside of the vehicle (e.g., forklift or prime mover) between the wheelbase via magnet pods 506 and 508.

Figure 6:
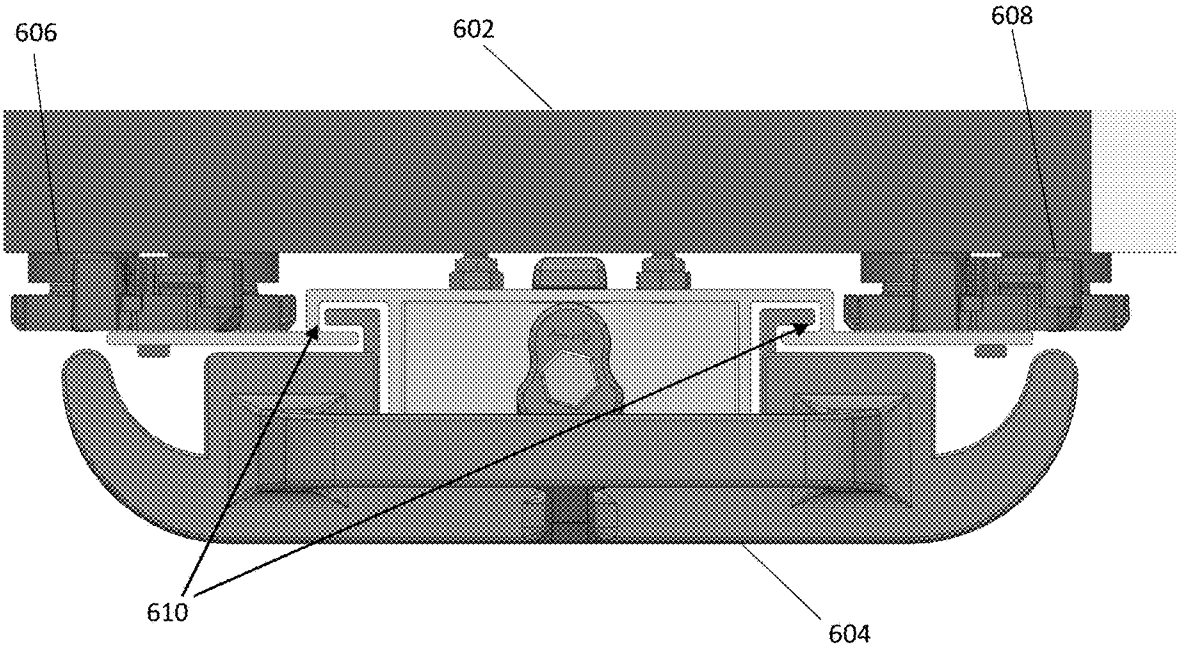
FIG. 6 is diagram of a close-up left side view of a magnetic sweeper apparatus.

FIG. 6 is diagram of a close-up left side view of a magnetic sweeper apparatus. According to FIG. 6, the magnetic sweeper apparatus 604 is shown connected to the bottom of a forklift 602 using magnet pods 606 and 608. The magnet pods 606 and 608 are tucked into the sides of the magnet housing to allow it to fit low ground clearance vehicles as shown in element 610.

Figure 7:
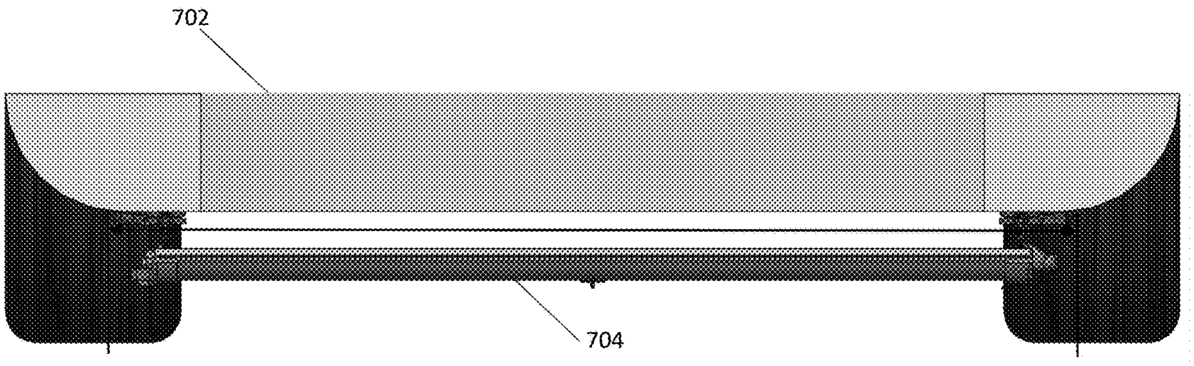
FIG. 7 is a diagram illustrating a back plan section view of a magnetic sweeper apparatus.

FIG. 7 is a diagram illustrating a back plan section view of a magnetic sweeper apparatus. According to FIG. 7, the magnetic sweeper apparatus 704 is positioned within the physical limits of the prime mover 702 (or forklift vehicle) and won't snag or catch on the ends.

Mounting Solution:

To address the mounting problem, this disclosure uses a series of rubber coated rare-earth pot magnets and a set of plastic injection molded parts to allow a magnet bar to be hung from the underbody of a forklift, fork truck or other prime mover or vehicle. A low-profile main pod frame with a cam adjustment knob allows a paracord, a type of nylon rope, to hold a magnet bar up from each of the four corners. The rare earth pot magnets mount into the pod frame, which can stick to the underbody of the prime mover and hold it suspended at a desired height.

Figure 8:
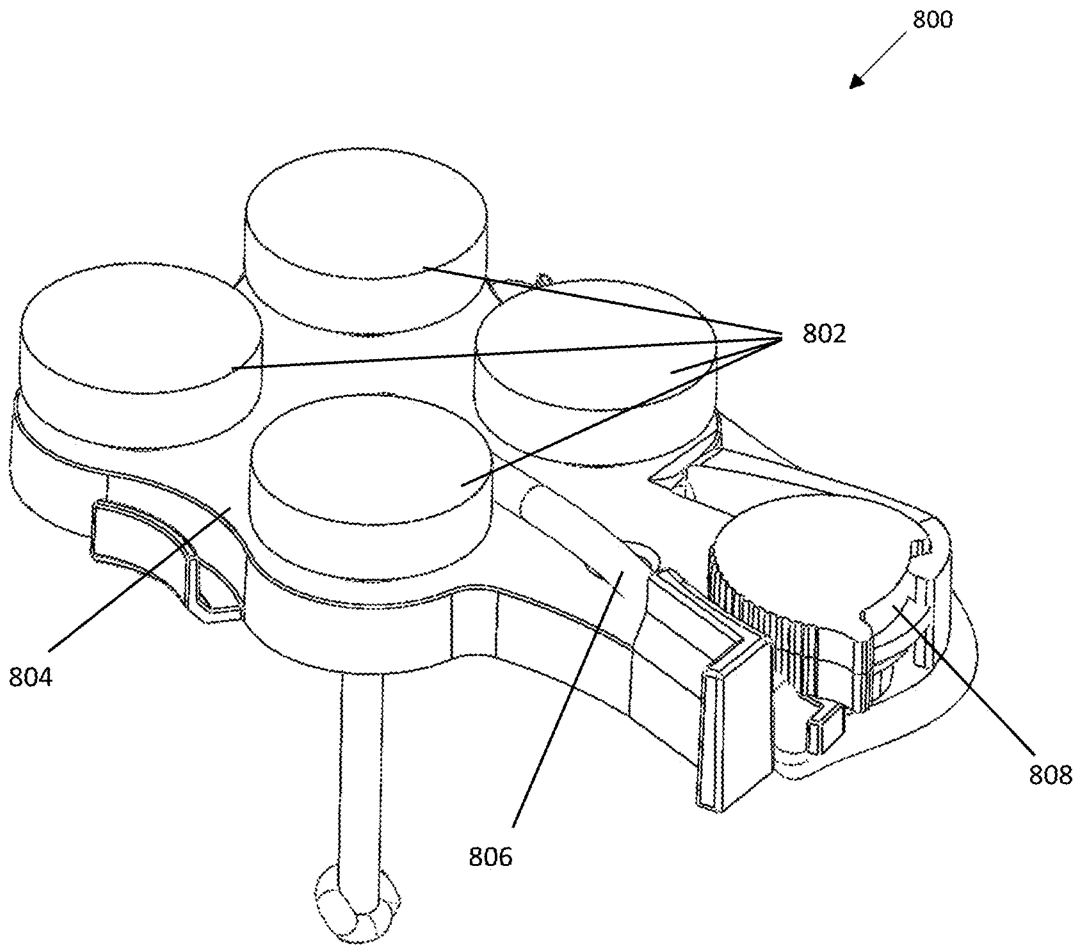
FIG. 8 is a diagram illustrating a perspective view of an exemplary magnetic sweeper mount apparatus.

FIG. 8 is a diagram illustrating a perspective view of an exemplary magnetic sweeper mount apparatus. According to FIG. 8, the magnetic sweeper mount apparatus 800 consists of four rubber-coated rare earth pod magnets 802 which attach to a nylon injection molded pod base 804 housing.

According to FIG. 8, a paracord 806 is shown connected to a nylon injection molded cam cleat 808. When pushed, the thumb tab on the edge of the cam cleat 808 relieves pressure on the paracord, allowing fine adjustment of the height of the bar itself after mounting it to the vehicle, to achieve desirable pickup strength. The cam cleat 808 works with the paracord 806 to offer a self-locking mechanism for height adjustment.

According to FIG. 8, to lower the magnetic sweeper mount apparatus 800, the cam cleat 808 must be pushed open while the paracord 806 is being held to guide the magnet down to an appropriate height. Alternatively pulling on the paracord 806 will raise the magnetic sweeper mount apparatus 800. The arm on the pod base 804 supplies constant force to the cam cleat 808, thus holding the paracord 806 in place while the magnetic sweeper mount apparatus 800 hangs.

Figure 9:
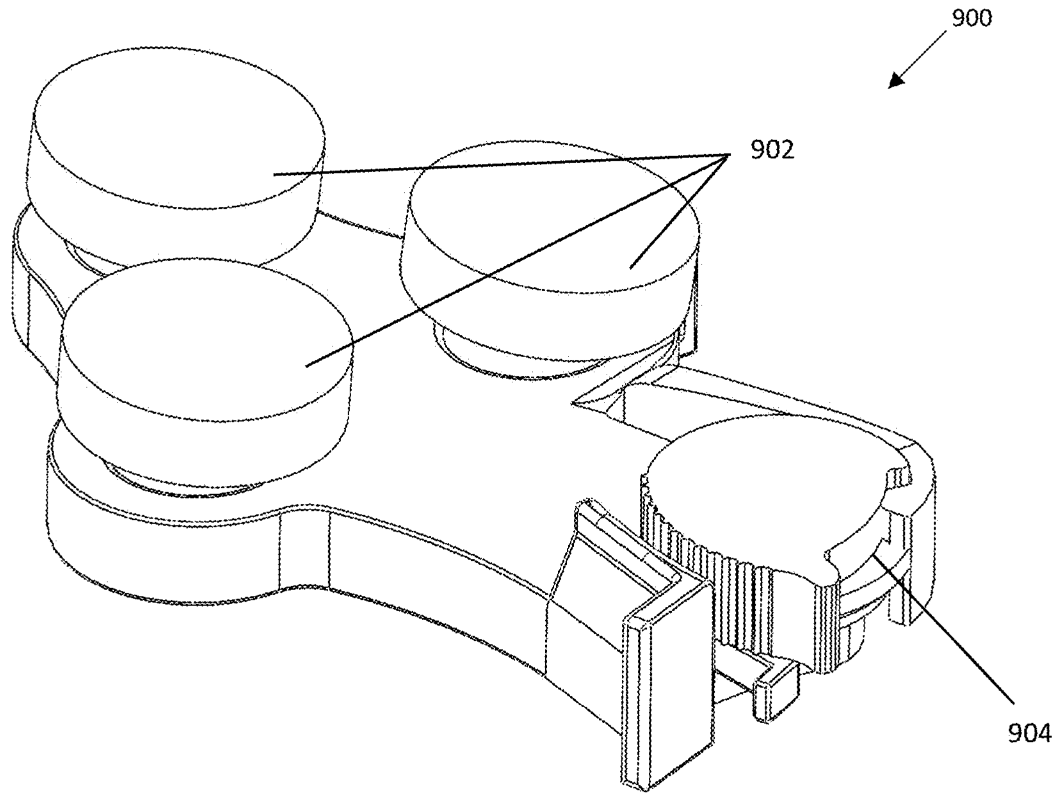
FIG. 9 is a diagram illustrating a perspective view of a second exemplary magnetic sweeper mount apparatus.

FIG. 9 is a diagram illustrating a perspective view of second exemplary magnetic sweeper mount apparatus. According to FIG. 9, a low-profile adaptation of a magnetic sweeper mount apparatus 900 is shown having three pods 902 and a cam cleat 904. According to FIGS. 8 and 9, dimensions of the magnetic sweeper mount apparatus are approximately 3.75" length, 2.25" width and 0.625" height.

Space Availability Solution:

The space availability problem is addressed by two unique innovations. The first innovation incorporates the use of an extruded aluminum magnet housing with offset flanges on each side to create a low-profile assembly that can fit under the body of the prime mover, between the wheels.

This constraint is especially a problem on low clearance forklifts including electric types and indoor forklifts. The flanges were added to each side of the aluminum extrusion as mounting points for the Magnet Pod attachment point, allowing the pods to tuck down the sides of the extrusion to achieve the low-profile assembly. If the pods were mounted to the top of the aluminum extrusion the height profile of the entire product would be higher. Furthermore, the flanges were added far out from the sides of the magnet housing.

Figure 10:
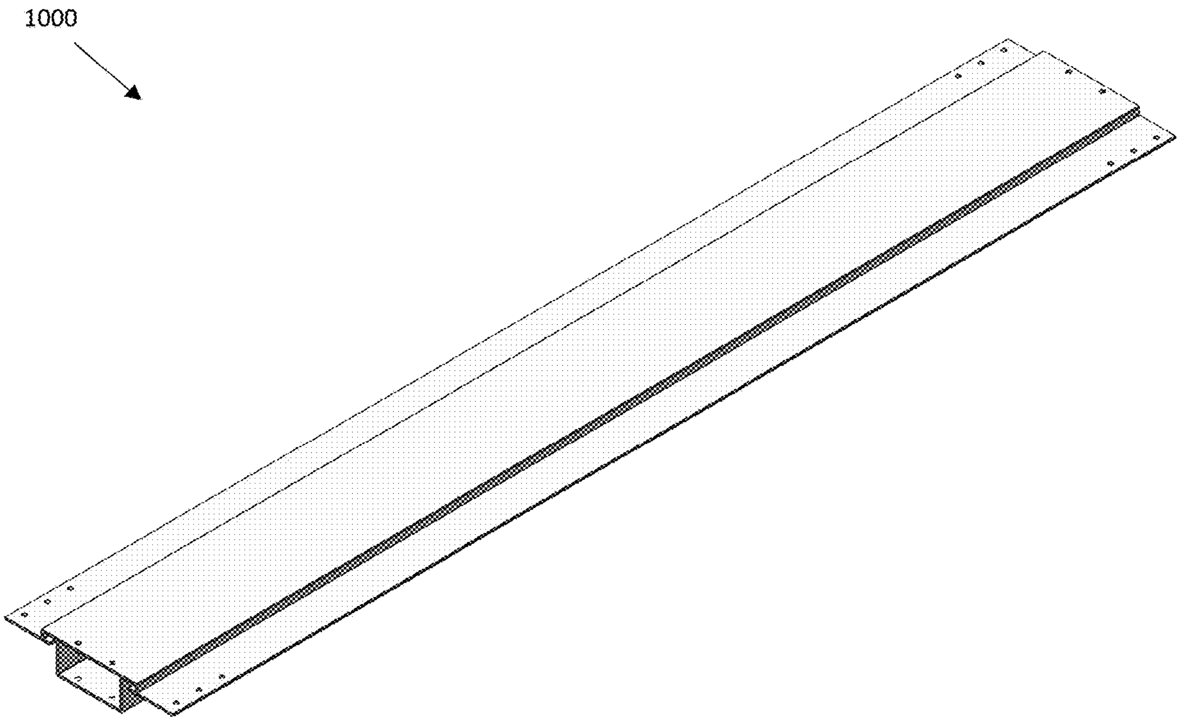
FIG. 10 is a diagram illustrating a perspective view of a magnet housing design.

FIG. 10 is a diagram illustrating a perspective view of a magnet housing design. According to FIG. 10, magnet housing design 1000 is shown with dimensions 38.125" length by 7.43" width by 1.45" height or with dimensions of 44.125" length by 7.43" width by 1.45" height and is made of such materials as aluminum, stainless steel, titanium, fiber-reinforced plastic (FRP), nylon or other thermoplastics.

Figure 11:
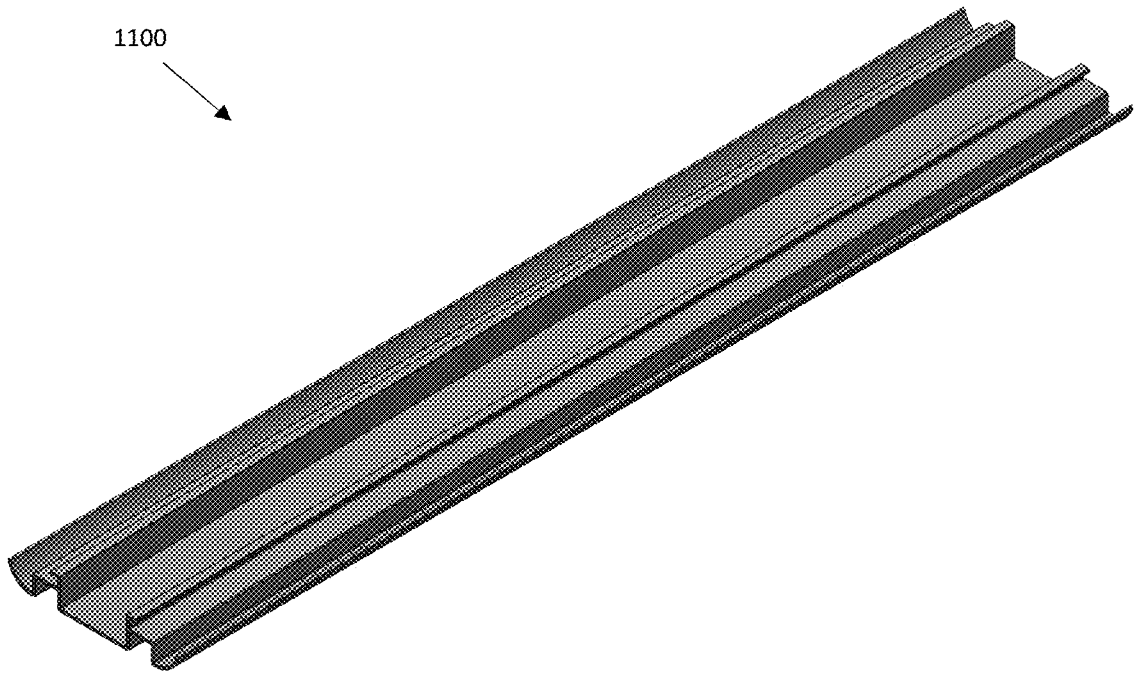
FIG. 11 is a diagram illustrating a perspective view of a quick clean-off sleeve design.

FIG. 11 is a diagram illustrating a perspective view of a quick clean-off sleeve design. According to FIG. 11, the quick clean-off sleeve 1100 has a smaller flange for mounting. The quick clean-off sleeve 1100 slides on over these smaller flanges. This plastic extrusion design enables the low profile of the product.

Figure 12:
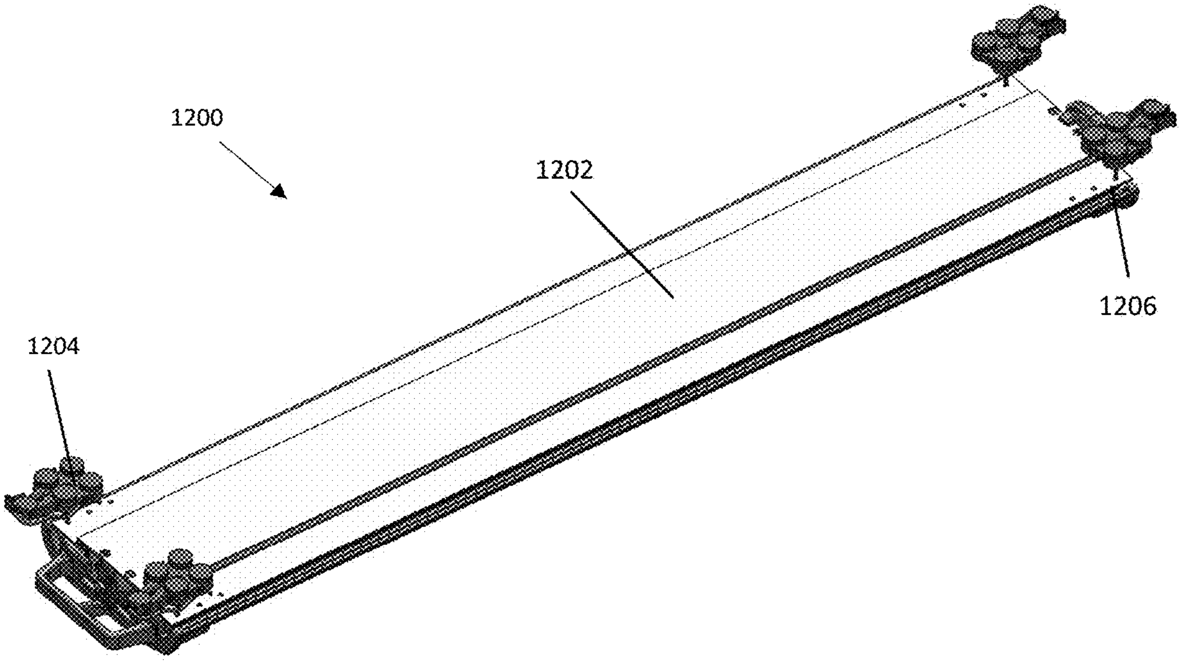
FIG. 12 is a diagram illustrating a perspective view of a magnet housing design showing corner mounts.

FIG. 12 is a diagram illustrating a perspective view of a magnet housing design showing corner mounts. According to FIG. 12, magnet housing 1200 is shown supporting magnet bar 1202 having four sets of magnet pods 1204. According to FIG. 12, the four sets of pods 1204 are shown to be mounted on each corner of the magnet bar for stability and strength as shown in element 1206. Magnet pods 1204 are configured to mount to the metallic underside surface of a forklift, prime mover or another industrial vehicle.

The second innovation incorporates the use of a newly designed quick clean-off sleeve comprised of a PVC extrusion, with a set of PVC end caps, one with a handle and one without. This was created to solve the problem of debris clean-off when a magnet is mounted under a forklift or other vehicle. According to the disclosure, the plastic PVC extrusion runs the length of the magnet bar and allows debris to stick on three sides of the magnet, which we call wrap around technology.

Figure 13:
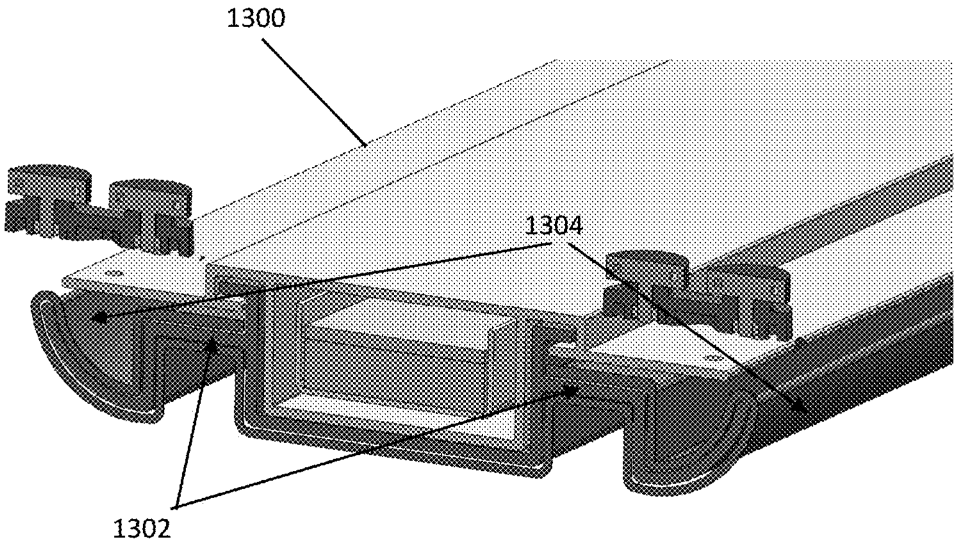
FIG. 13 is a diagram illustrating a cut away view of a magnet housing design.

FIG. 13 is a diagram illustrating a cut away view of a magnet housing design. According to FIG. 13, magnet housing 1300 wrap around technology is shown on the PVC quick clean-off sleeve 1302. Furthermore, round profiles 1304 on the front and back are shown to clear obstacles.

Figure 14:
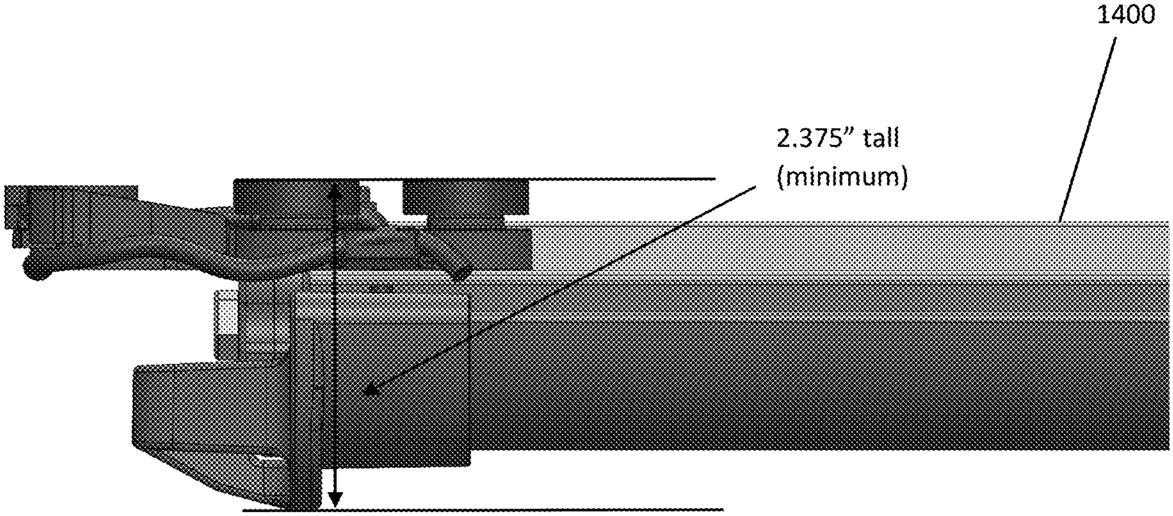
FIG. 14 is a diagram illustrating a left side view of a magnet housing design.

FIG. 14 is a diagram illustrating a left side view of a magnet housing design. According to FIG. 14, the magnet housing 1400 is shown having a minimum height of 2.375" height.

Figure 15:
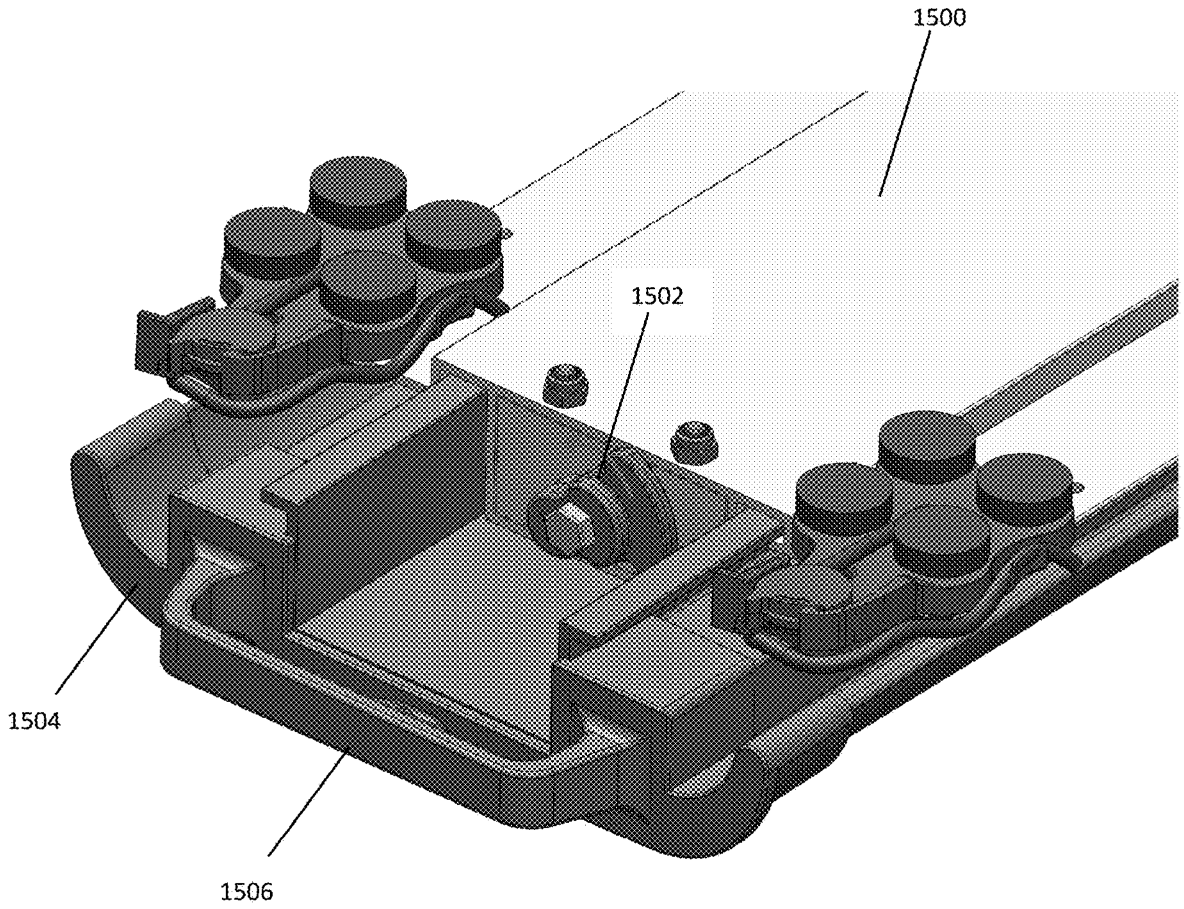
FIG. 15 is a diagram illustrating a perspective view of a sleeve pull handle.

FIG. 15 is a diagram illustrating a perspective view of a sleeve pull handle of the magnet housing design. According to FIG. 15, magnet housing 1500 has a pivoting latch 1502 to unlock the sleeve 1504 and allow it to slide. The user would pull the handle 1506 to remove the sleeve 1504 and remove the debris. According to FIG. 15, the debris falls to the ground when the sleeve is completely pulled off. Some debris will occasionally cling back to the magnet depending on the size, shape and orientation.

Figure 16:
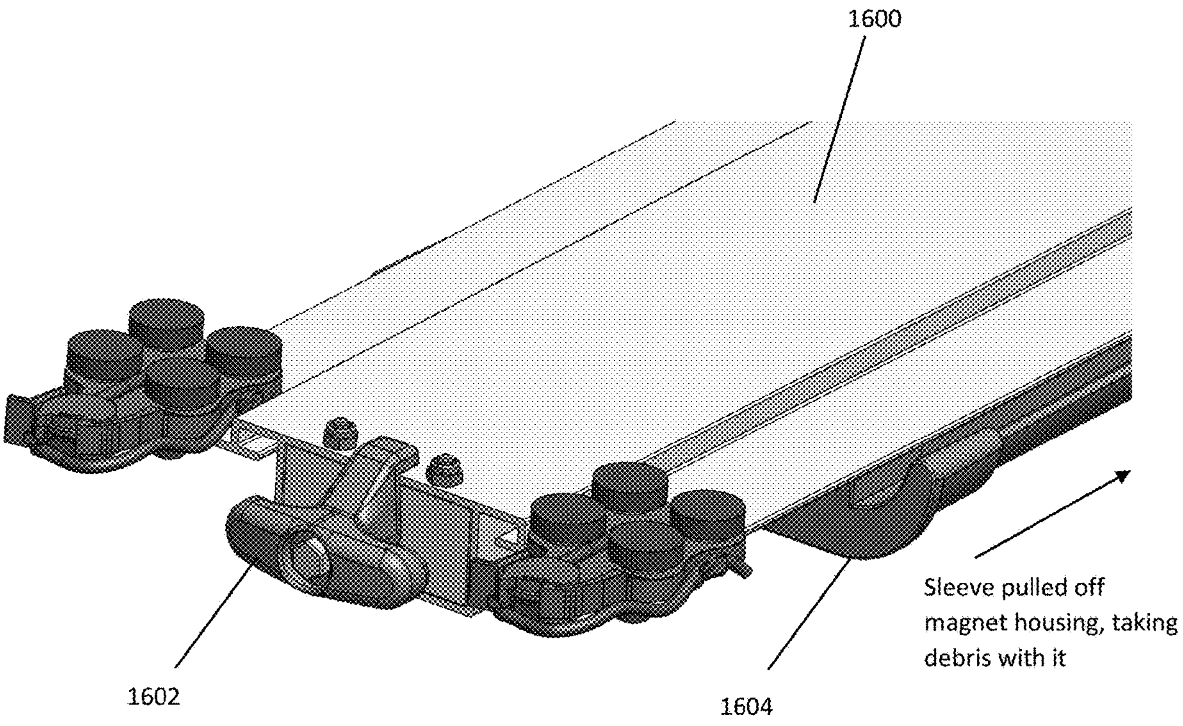
FIG. 16 is a diagram illustrating a perspective view of a housing T-handle design.

FIG. 16 is a diagram illustrating a perspective view of a housing T-handle design. According to FIG. 16, magnet housing 1600 has a T-Handle 1602 to hold the housing 1600 in place while the sleeve 1604 is removed, to prevent swinging. Pulling handle 1602 doesn't allow the sleeve to be removed. One person holds T-Handle 1602 to prevent swinging of the assembly, and one person pulls the sleeve from the other side in order to remove the collected debris.

Figure 17:
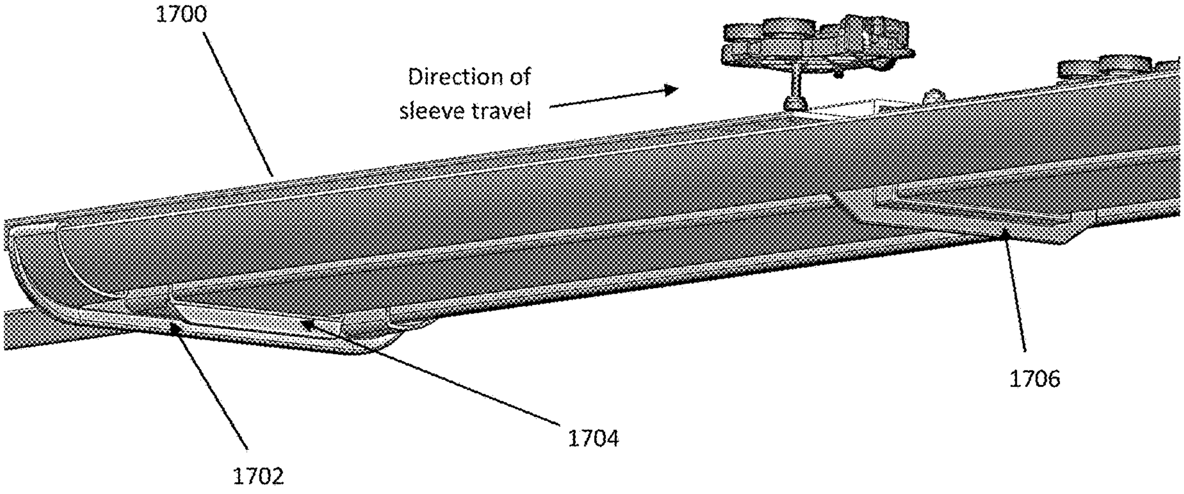
FIG. 17 is a diagram illustrating a perspective view of quick clean-off sleeve showing incremental debris removal.

FIG. 17 is a diagram illustrating a perspective view of quick clean-off sleeve showing incremental debris removal. According to FIG. 17, quick clean-off sleeve 1700 comprises a tertiary flange 1702 that is built into the end cap and prevents debris 'sucking back' onto the magnet housing as it passes over the end. A secondary flange 1704 pulls off the remainder of the collected debris as it passes over the end. Furthermore, an intermediate rib 1706 pulls off the collected debris from half the magnet as it passes over the end.

According to FIG. 17, the extrusion is held on vertically by sliding it between the C shaped profiles in the aluminum extrusion. The PVC injection molded end cap with the handle, keeps the sleeve on the magnet assembly and serves as a pull tab for removing the quick clean-off sleeve as a whole. It features a groove in which a swivel latch, a part of this invention, can move into place and prevent the sleeve from sliding left and right.

When the user wants to remove the debris, the swivel latch is pivoted out of place, and the handle is used to pull the sleeve, which provides an ergonomic and safe solution to remove the collected debris. The PVC injection molded end cap without the handle on the opposing side incorporates two lips/edges to be able to pull the debris away from the magnetic field as the sleeve is completely removed from the magnet housing.

The innermost lip works to remove most of the debris as it passes the end of the magnet with the outermost lip which works to prevent debris from "sucking back onto" the magnet when completely removing the sleeve. A glued-on rib feature also helps to allow this removal of debris in increments or stages to limit the amount of debris that could 'suck back'. All of these are unique and useful features which are new.

Debris Retention Solution:

To address the debris retention problem, a quick clean-off sleeve design is disclosed, incorporating wrap around technology with a set of large flanges on the front and back that gives it a rounded shape as shown in FIG. 17. This rounded shape allows the magnet to go up and over any obstacles it may hit on the ground. Any collected debris that is on the bottom of the magnet may be swept into the pockets on the front or rear of the PVC sleeve, which keeps it from being sheared off the magnet itself and prevents the debris from being redeposited on the ground. These pockets run the length of the magnet, allowing for a large amount of debris to be collected and safely held until the magnet is cleaned off.

According to the disclosure, this design centers around creating a low-profile underbody mounted magnetic sweeper that attaches via magnets. This solution not only allows the sweeper to be mounted in a non-destructive manner, but also not to hinder the normal operation of the forklift, prime mover or other industrial vehicles.

Figure 18:
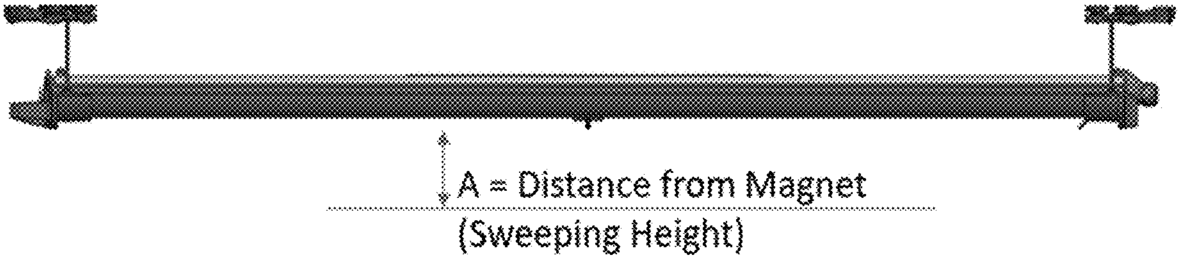
FIG. 18 is a diagram that illustrates the Gauss (G) measurements for the magnetic strength of the rare earth magnets.

According to the disclosure, the magnets can be Neodymium 42 rare earth magnets or Ceramic 8 magnets. FIG. 18 is a diagram that illustrates the Gauss (G) measurements for the magnetic strength of the Neodymium 42 rare earth magnets. According to FIG. 18, sweeping height A is the distance from the magnet. The following table (also shown in FIG. 18) illustrates the relationship between sweeping height and magnet strength (in Gauss):

| Distance A | 1" | 2" | 3" |
|---|---|---|---|
| Peak Gauss (G) | 630 | 254 | 134 |

According to FIG. 18, the closer the sweeping height (Distance A), the stronger the magnetic force and the larger the sweeping height, the smaller the magnetic strength. For example, at 1", the magnetic strength is 630 G and at 3", the magnetic strength is 134 G.

Figure 19:
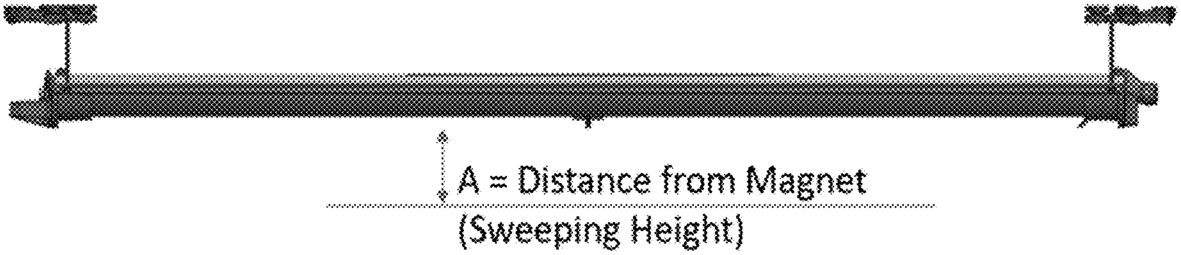
FIG. 19 is a diagram that illustrates the Gauss (G) measurements for the magnetic strength of the Ceramic 8 magnets.

FIG. 19 is a diagram that illustrates the Gauss (G) measurements for the magnetic strength of the Ceramic 8 magnets. According to FIG. 18, sweeping height A is the distance from the magnet. The following table (also shown in FIG. 18) illustrates the relationship between sweeping height and magnet strength (in Gauss):

| Distance A | 1" | 2" | 3" |
|---|---|---|---|
| Peak Gauss (G) | 358 | 185 | 106 |

According to FIG. 19, the closer the sweeping height (Distance A), the stronger the magnetic force and the larger the sweeping height, the smaller the magnetic strength. For example, at 1", the magnetic strength is 358 G and at 3", the magnetic strength is 106 G.

According to the disclosure, the magnet housed in the magnet housing can be a rare earth or ceramic 8 magnet. Dimensions of the rare earth magnet can be 36.25" length, 2.25" width and 0.91" height or 42.25" length, 2.25" width and 0.91" height. The dimensions of the ceramic 8 magnet can be 36" length, 2.5" width and 1" height or 42" length, 2.5" width and 1" height.

According to the disclosure, a low-profile mounted permanent magnetic sweeper apparatus, configured for attachment to an industrial vehicle for magnetic sweeping of metallic debris is disclosed. The apparatus comprises a magnet housing, a magnet bar housed within the magnet housing, a plurality of magnet pods mounted onto the corners of the magnet housing and connecting the magnet housing to the bottom surface of the industrial vehicle, a sleeve beneath the magnet housing to collect magnetic debris.

According to the disclosure, the metallic debris accumulates on the sleeve as the industrial vehicle moves and the sleeve can be pulled off the magnet housing whereby the metallic debris can be removed and the magnet housing is configured to fit the industrial vehicle for low ground clearance. The industrial vehicle of the apparatus is a forklift or a prime mover vehicle.

According to the disclosure, the sleeve further of the apparatus further comprises a pull handle, having a T-handle and a pivoting latch to unlock the sleeve and allowing it to slide. The user would pull the pull handle to remove the sleeve and remove the metallic debris, whereby the metallic debris falls to the ground when the sleeve is completely pulled off.

According to the disclosure, the apparatus further comprising a plurality of rare earth magnet pods or Ceramic 8 magnet pods which is configured to attach to a nylon injection molded pod base housing. The pod base housing further comprising a paracord and a nylon injection molded cam cleat configured as a self-locking mechanism for height adjustment. When pushed, a thumb tab on the edge of the cam cleat relieves pressure on the paracord, allowing fine adjustment of the height of the apparatus to achieve desirable magnetic pickup strength.

According to the disclosure, the magnetic sweeper apparatus is configured with dimensions of 8.95" width, 46.23" length and 2.375" height and operates within 1-3" of the ground. The apparatus of claim 1 wherein the magnet housing is configured with dimensions of 38.125" length, 7.43" width and 1.45" height or with dimensions of 44.125" length, 7.43" width and 1.45" height. The magnet housing is made of a material selected from a list consisting of aluminum, stainless steel, titanium, fiber-reinforced plastic (FRP), nylon or other thermoplastics. The magnet bar is a rare earth or ceramic 8 magnet with dimensions that can fit the magnet housing.

According to the disclosure, the sleeve is a quick clean-off sleeve. The quick clean-off sleeve further comprising end caps and a flange for mounting to the magnet housing, a tertiary flange that is built into the end cap and prevents debris sucking back onto the magnet housing as it passes over the end, a secondary flange that pulls off the remainder of the collected debris as it passes over the end and an Intermediate rib that pulls off the collected debris from half the magnet as it passes over the end.

According to the disclosure, a method of removing metallic debris, using a low-profile mounted permanent magnetic sweeper attachment to an industrial vehicle, the attachment further comprising a magnet housing, a magnet bar, a plurality of magnet pods and a quick clean-off sleeve is disclosed. The method comprising the steps of mounting the magnetic sweeper attachment to the industrial vehicle, attracting metallic debris at the bottom of the sleeve of the magnetic sweeper attachment as the industrial vehicle moves forwards or backwards and removing the quick clean-off sleeve from magnet housing of the magnetic sweeper attachment to remove the metallic debris. The industrial vehicle is a forklift or a prime mover vehicle.

According to the disclosure, the sleeve of the method further comprises a pull handle, having a T-handle and a pivoting latch to unlock the sleeve and allowing it to slide, wherein the user would pull the pull handle to remove the sleeve and remove the metallic debris, whereby the metallic debris falls to the ground when the sleeve is completely pulled off.

According to the disclosure, the apparatus of the method further comprises a pod base housing. The pod base housing further comprises a paracord, a nylon injection molded cam cleat configured as a self-locking mechanism for height adjustment. When pushed, a thumb tab on the edge of the cam cleat relieves pressure on the paracord, allowing fine adjustment of the height of the apparatus to achieve desirable magnetic pickup strength.

According to the disclosure, the magnet bar and magnet pods of the method are rare earth magnet or ceramic 8 magnet. The magnet housing of the method is made of a material selected from a list consisting of aluminum, stainless steel, titanium, fiber-reinforced plastic (FRP), nylon or other thermoplastics.

According to the disclosure, the quick clean-off sleeve further comprises end caps on the end of the quick clean-off sleeve, a flange for mounting to the magnet housing, a tertiary flange that is built into the end cap and prevents debris sucking back onto the magnet housing as it passes over the end, a secondary flange that pulls off the remainder of the collected debris as it passes over the end and an Intermediate rib that pulls off the collected debris from half the magnet as it passes over the end.

While some embodiments or aspects of the present disclosure may be implemented in fully functioning mechanical, electrical and electrical-mechanical systems, other embodiments may be considered.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

The specific embodiments described above have been shown by way of example and understood is that these embodiments may be susceptible to various modifications and alternative forms. Further understood is that the claims are not intended to be limited to the forms disclosed, but to cover all modifications, equivalents, and alternatives falling within the spirit and scope of this disclosure. While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become obvious to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, various changes and modifications in form, material, workpiece, and fabrication material detail may be made, without departing from the spirit and scope of the present disclosure, as set forth in the appended claims, as may be apparent to those of ordinary skill in the art, are also encompassed by the present disclosure.

What is claimed is:

1. A method of removing metallic debris, using a mounted permanent magnetic sweeper attachment to an industrial vehicle, the magnetic sweeper attachment further comprising a magnet housing, a magnet bar, a plurality of magnet pods a clean-off sleeve, and a pod base housing, the method comprising the steps of:

mounting the magnetic sweeper attachment to the industrial vehicle;

attracting metallic debris at a bottom of the clean-off sleeve of the magnetic sweeper attachment as the industrial vehicle moves forwards or backwards; and removing the clean-off sleeve from the magnet housing of the magnetic sweeper attachment to remove the metallic debris;

wherein the pod base housing further comprises a paracord and a nylon injection molded cam cleat configured as a self-locking mechanism for height adjustment of the magnetic sweeper attachment, wherein when pushed, a thumb tab on the edge of the cam cleat relieves pressure on the paracord, allowing for the height adjustment of the magnetic sweeper attachment to achieve desirable magnetic pickup strength.

2. The method of claim 1 wherein the clean-off sleeve further comprises:

a pull handle, having a T-handle; and a pivoting latch to unlock and slide the sleeve;

wherein a user would pull the pull handle to remove the clean-off sleeve and remove the metallic debris, whereby the metallic debris falls to the ground when the sleeve is completely pulled off.

3. The method of claim 1 wherein the magnet bar and the plurality of magnet pods are rare earth and ceramic magnets.

4. The method of claim 1 wherein the magnet housing is made from a material selected from the group consisting of aluminum, stainless steel, titanium, fiber-reinforced plastic (FRP), and nylon.

5. The method of claim 1 wherein the industrial vehicle is a forklift or a prime mover vehicle.

* * * * *